(12) United States Patent
Scheetz et al.

(10) Patent No.: US 7,043,726 B2
(45) Date of Patent: May 9, 2006

(54) BINDING OF PROCESSES IN NETWORK SYSTEMS

(75) Inventors: Michael Scheetz, Fort Collins, CO (US); Humberto A Sanchez, II, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 09/812,769

(22) Filed: Mar. 20, 2001

(65) Prior Publication Data

US 2002/0138665 A1    Sep. 26, 2002

(51) Int. Cl.
*G06F 9/46* (2006.01)
*G06F 9/455* (2006.01)

(52) U.S. Cl. .......................................... 718/1; 718/100
(58) Field of Classification Search ................ 719/313, 719/315–316; 718/1, 100
See application file for complete search history.

(56) References Cited

U.S. PATENT DOCUMENTS

| | | | |
|---|---|---|---|
| 5,790,130 A | | 8/1998 | Gannett |
| 5,943,398 A | | 8/1999 | Klein et al. |
| 6,282,581 B1 * | 8/2001 | Moore et al. ............... 719/316 |
| 6,408,342 B1 * | 6/2002 | Moore et al. ............... 719/330 |
| 6,643,650 B1 * | 11/2003 | Slaughter et al. ............. 707/10 |
| 6,664,978 B1 * | 12/2003 | Kekic et al. ................ 345/733 |

OTHER PUBLICATIONS

Avvenuti et al., "Supporting Remote Reference Updating Through Garbage Collection in a Mobile Object System", Parallel and Distributed Processing, Proceedings Ninth Euromicro Workshop, pp. 65-70 (2001).*
Parlavantzas et al., "An Extensible Binding Framework for Component-Based Middleware", Enterprise Distributed Object Computing Conference. Proceedings Seventh IEEE International, pp. 252-263 (Sep. 2003).*
Lu et al., "A RMI Protocol for Aglets", Proceedings of the 27th Conference on Australasian Computer Science, vol. 26, pp. 249-253 (Jan. 2004).*
Tanter et al. "Managing References upon Object Migration: Applying Separation of Concerns"; Proceedings of the XXI International Conference of the Chilean Computer Science Society; IEEE Computer Science Press; Patagonia, Chile (Nov. 2001).*
"Java Remote Method Invocation Specification", http://java.sun.com/j2se/1.3/pdf/rmi-spec-1.3.pdf (Dec. 1999).*
HP Servicecontrol Manager white paper, available at http://h41214.www4.hp.com/SCMGR/infolibrary/scm_whitepaper.pdf (Mar. 2003).*

* cited by examiner

*Primary Examiner*—Meng-Al T. An
*Assistant Examiner*—Syed J Ali

(57) ABSTRACT

Binding processes in a network system involves monitoring the status of RMI processes by running a thread associated with a parent process. Each parent process in the network system is associated with a watchdog object that initiates a thread, the thread monitoring the status of RMI processes. If the thread determines that its associated parent process is not bound with an active RMI process, the thread automatically rebinds its parent process with an active RMI process.

13 Claims, 4 Drawing Sheets

BINDING OF PROCESSES IN NETWORK SYSTEMS

BACKGROUND OF THE INVENTION

1. Field of the Invention

The present invention relates to binding processes in a network system. More specifically, the present invention relates to ensuring that processes are bound to an active remote method invocation (RMI) process by monitoring the status of the RMI process.

2. Related Art

Administration of large, multi-server, computing environments is a field of growing interest as the number and size of large, multi-server computing environments grows. The field of multi-server system administration and management focuses on maintaining the physical operation of a multitude of computer systems, often referred to as nodes, connected in a network. This task includes a number of functions, including adding, modifying and removing nodes, users, tools, and roles; defining groups of nodes; authorizing users to perform operations on nodes; installing, maintaining and configuring hardware; installing and upgrading operating system and application software; and applying software patches, among other functions.

A typical network includes a plurality of nodes, which are managed by a service control manager (SCM) running on a central management server (CMS). The nodes comprise a service control manager cluster, and can be further organized into node groups. In a CMS, a plurality of processes, referred to as "daemons," are employed to perform tasks essential to run the network. The daemons are processes that perform tasks such as logging management actions by the SCM, managing users, and monitoring tasks assigned to nodes.

The daemons performing the above tasks may be located on differing JAVA® virtual machines (JVM), and remote method invocation (RMI) daemons are run in the network to allow daemons to communicate with one another. The RMI daemons serve as locators for daemons in the network, with agent daemons on each node accessing the RMI daemons in order to determine the network address, or universal resource locator (URL), for daemons in the network. A daemon in the network becomes accessible to users or other daemons by registering its URL in a URL list of an RMI daemon. This is commonly referred to as the daemon "binding" with the RMI daemon.

In conventional networks, if an RMI daemon becomes inactive for some reason, functioning daemons (and other processes) in the network remain bound to the inactive RMI daemon. In this case, it is not possible to communicate with the daemons bound to the inactive RMI daemon, because active RMI daemons would not include these daemons in their URL lists. In response to this situation, the network system restarts the daemons bound with the inactive RMI daemon. When the daemons restart, they are required to go through the process of registering with a new, active RMI daemon, which is time-consuming and introduces delay into the operation of the network.

Therefore, a need exists for a method of binding processes in a network that does not require restarting all of the processes bound with an RMI process when the RMI process becomes inactive.

SUMMARY OF THE INVENTION

The present invention overcomes the shortcomings of conventional methods and devices and may achieve further advantages not contemplated by conventional methods and devices.

According to a first aspect of the invention, processes in a network are each associated with a corresponding object, each object being capable of initiating a thread for monitoring the status of RMI. Processes having such an associated object are referred to as "parent processes." According to an embodiment of the invention, a method of binding the parent processes comprises binding a parent process with an RMI process, and calling an object associated with the parent process, the object initiating a thread. The thread performs the steps of monitoring the status of RMI processes, and rebinding the parent process with an active RMI process when the object determines that its parent process is not bound with an active RMI process.

According to the first aspect of the invention, parent processes in a network system need not be restarted when an RMI process becomes inactive, and may instead be automatically rebound with an active RMI process by the thread. Automatic rebinding of the parent process avoids delay and inconvenience to users of the network.

Other aspects and advantages of embodiments of the invention will be discussed with reference to the figures and to the detailed description of the preferred embodiments.

DETAILED DESCRIPTION OF PREFERRED EMBODIMENTS

A network system and a method for binding processes in a network system according to the present invention will be described below by way of preferred embodiments and with reference to the accompanying drawings.

Figure 1:
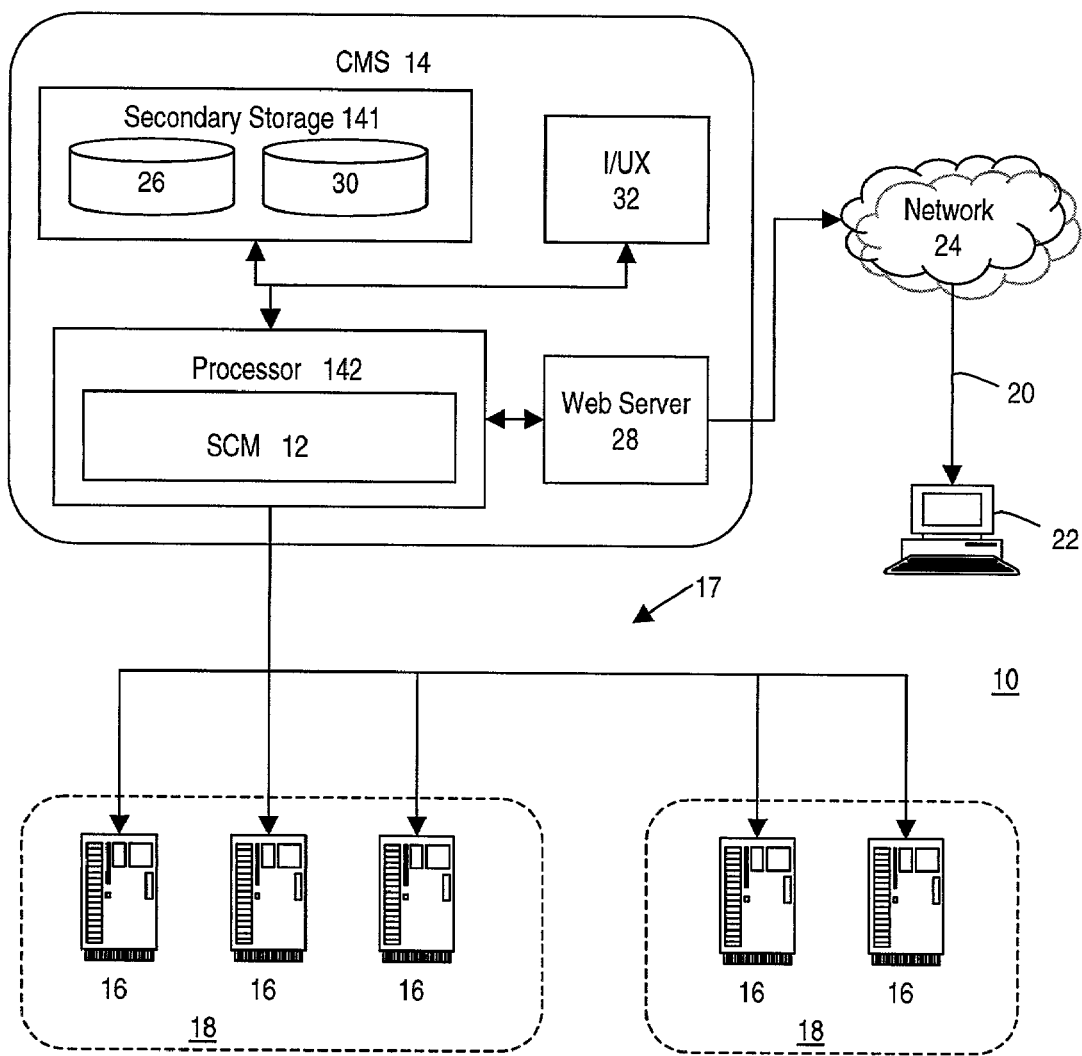
FIG. 1 illustrates a network system according to an embodiment of the present invention.

FIG. 1 illustrates an exemplary network system 10 according to an embodiment of the present invention. The network system 10 comprises an SCM 12 running on a CMS 14, and a plurality of remote nodes 16 managed by the SCM 12 on the CMS 14. Together, the plurality of remote nodes 16 managed by the SCM 12 make up an SCM cluster 17. A group of remote nodes 16 may be further organized into node groups 18.

The CMS 14 may be, for example, an HP-UX 11.x server running the SCM 12 software. The CMS 14 includes a memory (not shown), a secondary storage device 141, a processor 142, an I/UX server 32, an input device (not shown), a display device (not shown), and an output device (not shown). The memory, a computer readable medium, may include RAM or similar types of memory, and it may store one or more applications for execution by the processor 142, including the SCM 12 software. The secondary storage device 141 includes a data repository 26 for the SCM cluster 17, and a depot 30. The secondary storage device 141 may comprise a hard disk drive, a floppy disk drive, a CD-ROM drive, and other types of non-volatile data storage media. The CMS 14 also includes a web server 28 that allows web access to the SCM 12.

The processor 142 executes the SCM 12 software and other applications, which are stored in memory or in the secondary storage device 141, or received from the Internet or, in general, from another network 24. The SCM 12 may be programmed in Java®, and may operate in a Java® environment. Java® is an object-oriented program, and objects operating in a Java® Virtual Machine ("JVM") provide the functionality of the SCM 12. Object-oriented programming is a method of programming that pairs programming tasks and data into re-usable chunks known as objects—each object comprising attributes (i.e., data) that define and describe the object. Java classes are meta-definitions that define the structure of a Java object. Java classes, when instantiated, create instances of the Java classes and are then considered Java objects.

A detailed description of SCM is provided in, for example, HP Servicecontrol Manager white paper, which is hereby incorporated by reference, and which is available from Hewlett-Packard Company.

Generally, the SCM 12 supports managing an SCM cluster 17 from the CMS 14. Tasks performed on the SCM cluster 17 are initiated on the CMS 14 either directly or remotely, for example, by reaching the CMS 14 via a web connection 20. Therefore, a workstation 22 at which a user sits needs only the web connection 20 over the network 24 to the CMS 14, in order to perform tasks on the SCM cluster 17.

Figure 2:
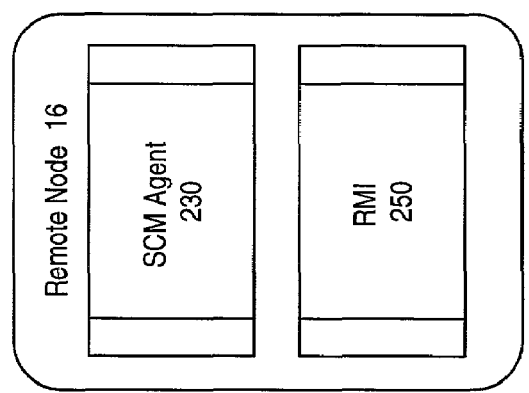
FIG. 2 illustrates a portion of a network according to an embodiment of the present invention.
Figure 2:
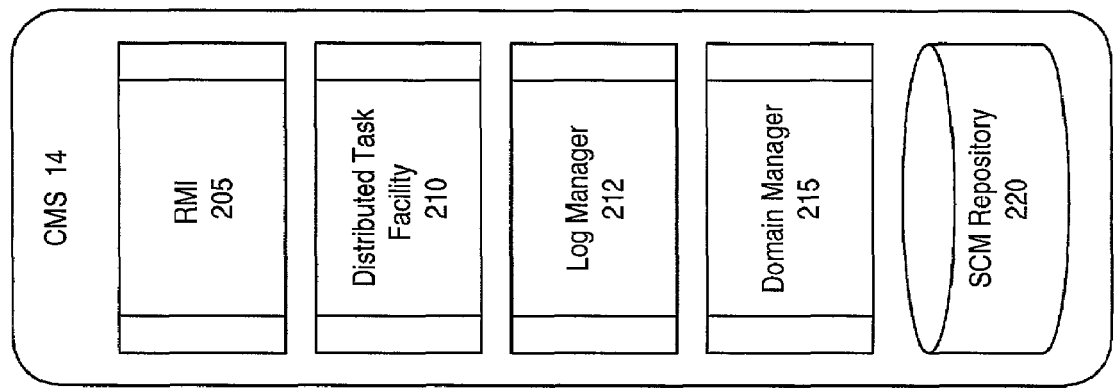

FIG. 2 illustrates a portion of the network system 10 according to an embodiment of the present invention. FIG. 2 illustrates the CMS 14, and one of the remote nodes 16 of the network system 10.

In the exemplary embodiment illustrated by FIG. 2, the functions of the SCM 12 are divided into a plurality of separate, long running, independently executing processes, which are referred to in the terminology of the UNIX systems community as "daemons." FIG. 2 shows four such processes running on the CMS 14: a Distributed Task Facility (for example, an ADTF@ process) process 210; a Log Manager process 212; a Domain Manager process 215; and an RMI process 205. For convenience, a process run by the CMS 14 can be generally referred to as a "management daemon," if the process is a daemon, or, more generally, as a "management process."

The Log Manager process 212 performs all of the functions of the SCM 12 necessary to maintain a log of the system management actions taken by the SCM 12. The log serves as an audit trail permitting an accounting of each step of each task performed by the SCM 12 on any of the nodes 16, node groups 18, or the SCM cluster 17, as well as on the CMS 14 itself. The Domain Manager process 215 performs the functions of the SCM 12 relating to the management of users and user groups on the SCM cluster 17. The Distributed Task Facility process 210 handles the assignment and monitoring of tasks assigned to be performed on each of the remote nodes 16. The RMI process 205 may be a JAVA® RMI process. Any of the processes 205, 210, 212, 215, 230 may be daemons.

Additional or different combinations of processes may be included in the CMS 14, and the configuration illustrated by FIG. 2 is intended to be exemplary.

The remote node 16 is illustrated as running a JAVA® RMI process 250, and an SCM Agent process (for example, an ASCM Agent@ process) 230. The remote node 16 is illustrated as running the SCM agent process 230 and the RMI process 250. The CMS 14 also includes an SCM Repository 220. The RMI process 250 allows the processes 210, 212, 215, 230, which may be started in their own JVMs, to communicate with each other, even though they are in different JVMs.

In SCM environments such as those illustrated in FIG. 2, the RMI process 250 acts as an index, or locator. When one or more processes, such as the processes 210, 212, 215, 230, are started, the RMI process 250 stores the URL and object interface of each process that requires RMI functionality. The RMI process can respond to any process that may be looking for another one of the registered processes on the remote managed node 16 where the process can be found. For example, when the DTF process 210 needs to communicate with the agent process 230 to instruct it to perform an operation, it connects with the RMI process 250 and asks the RMI process 250 where the SCM agent process 230, of the given URL is located. The RMI process 250 responds with the interface object of the SCM agent process 230. The DTF process 210 may then connect with the SCM agent process 230 and communicate with it directly.

Before a process can be accessed in a network system, it must be registered with an active RMI process. A process registers with an RMI process by calling an RMI process initiated by an RMI object, which can be, for example, a JAVA® naming ("Naming") object, and providing its URL and interface object to the RMI process. In this manner, the process becomes "bound" with the RMI process, and other processes, users, or other entities, may then access the process through the RMI process. Each unique machine that has a process operating in a JVM requires an RMI process to be present.

Difficulties arise in conventional networks when an RMI process servicing a node becomes inactive for some reason, because processes bound with the inactive RMI process would not be locatable. Instead, an attempt to access a process bound with an inactive RMI process would result in contact with an active RMI process that does not include the requested process in its bound URL list. Conventional networks resolve this problem by an inefficient restart (automatically performed by the operating system) of the processes bound with the inactive RMI process, so that the registered processes can again bind (or, "rebind") with the active RMI process.

The present invention overcomes the above shortcomings of conventional networks and achieves further advantages. According to an embodiment of the present invention, a process may be associated with its own object, which may be referred to as a "watchdog object," the watchdog object serving to initiate a thread, which may be conveniently referred to as a "watchdog thread." The watchdog thread monitors the status of RMI processes in order to determine whether the watchdog object's associated process is currently bound with an active RMI process in the network system 10. The watchdog thread acts to rebind its associated process with an active RMI process when the RMI process to which it is bound is no longer active. This function obviates the need to restart all of the processes bound with an RMI process when the RMI process becomes inactive. The network system 10 therefore operates more efficiently because processes become accessible as soon as an active RMI process becomes available to register the processes.

Processes in the network system 10 including an associated watchdog object may be conveniently referred to as "parent processes." Similarly, a daemon process including an associated watchdog object may be referred to as a "parent daemon." The watchdog thread may be employed in any process in the network system 10 that relies on RMI to communicate with other processes or users in the network system 10. Processes that may employ the watchdog thread include, for example, the processes 210, 212, 215, 230.

In FIG. 2, the functions of the SCM 12 are divided into separate processes to improve the reliability of the network. The configuration in FIG. 2, however, is merely illustrative, and other SCM network configurations employing RMI processes are also suitable for use with the present invention.

Figure 3:
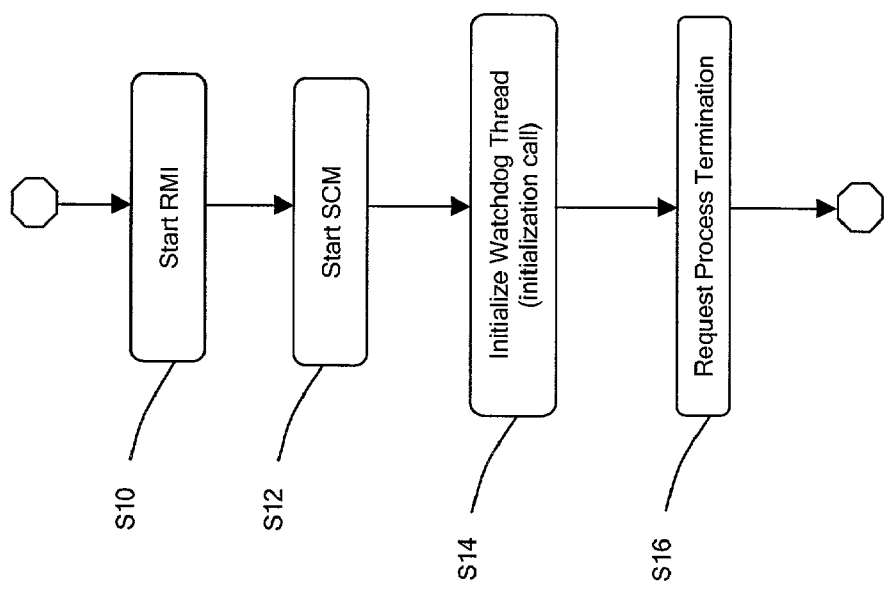
FIG. 3 is a flow chart illustrating the startup of processes and a watchdog thread associated with parent processes.

The operation of the watchdog thread will now be discussed with reference to FIG. 3. FIG. 3 is a flow chart illustrating the startup of the parent processes in the network system 10, and the startup of watchdog threads associated with parent processes in the network system 10.

In step S10, an RMI process is started. The RMI process can be started during installation of the SCM 12, or when other processes in the network are started. The other SCM processes in the network system 10 are then started in step S12.

In step S14, a watchdog object is called for each parent process, which initiates a watchdog thread for each parent process. In general, each parent process performs a method call to a watchdog object, which initiates a watchdog thread for that parent process. The watchdog thread monitors the status of the RMI process in order to determine whether the RMI process has registered its parent process. The operation of the watchdog thread, including the initialization call, will be discussed in further detail with reference to FIGS. 4 and 5.

Step S16 illustrates the termination of a parent process. As discussed with reference to FIG. 4, if the terminated process is a parent process, the watchdog thread for the parent process may then be terminated, as its function is no longer required. One or more parent processes may be terminated to, for example, perform maintenance on the SCM 12.

Figure 4:
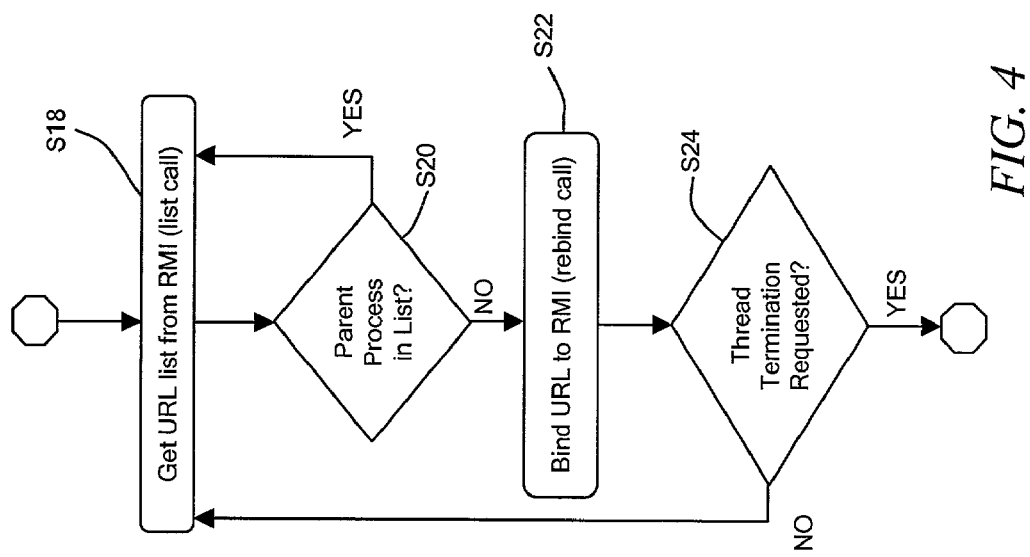
FIG. 4 illustrates the operation of a watchdog thread associated with a particular parent process.

FIG. 4 illustrates the operation of a watchdog thread associated with a particular parent process. In step S18, the watchdog thread obtains a bound URL list from the RMI process via a list call. In step S20, the watchdog thread then determines whether its parent process's name is in the bound URL list of the RMI process. If the watchdog thread's parent process URL is in the bound URL list (i.e., the parent process is bound, or registered, with the RMI process) the watchdog thread returns to step S18, and periodically monitors the status of the RMI process for the presence of the parent process URL in the bound URL list.

If the watchdog thread's parent process URL is not in the bound URL list (i.e. the parent process is not bound, or registered, with the RMI process) the watchdog thread requests the RMI process to bind (via a rebind call) the parent process URL with the current, active RMI process (step S22). The parent process URL may be absent from the bound RMI list of an active RMI process if, for example, the RMI process to which the parent process was bound became inactive for some reason.

Because the parent process is now bound with the active RMI process, users, daemons, and other processes attempting to access the parent process can now communicate with the parent process. If the parent process were not rebound with an active RMI process, the active RMI process would report that the parent process was not bound to it, and the parent process would not be accessible.

In step S24, it is determined whether thread termination has been requested. The watchdog thread may be terminated, for example, when its parent process has been terminated.

Figure 5:
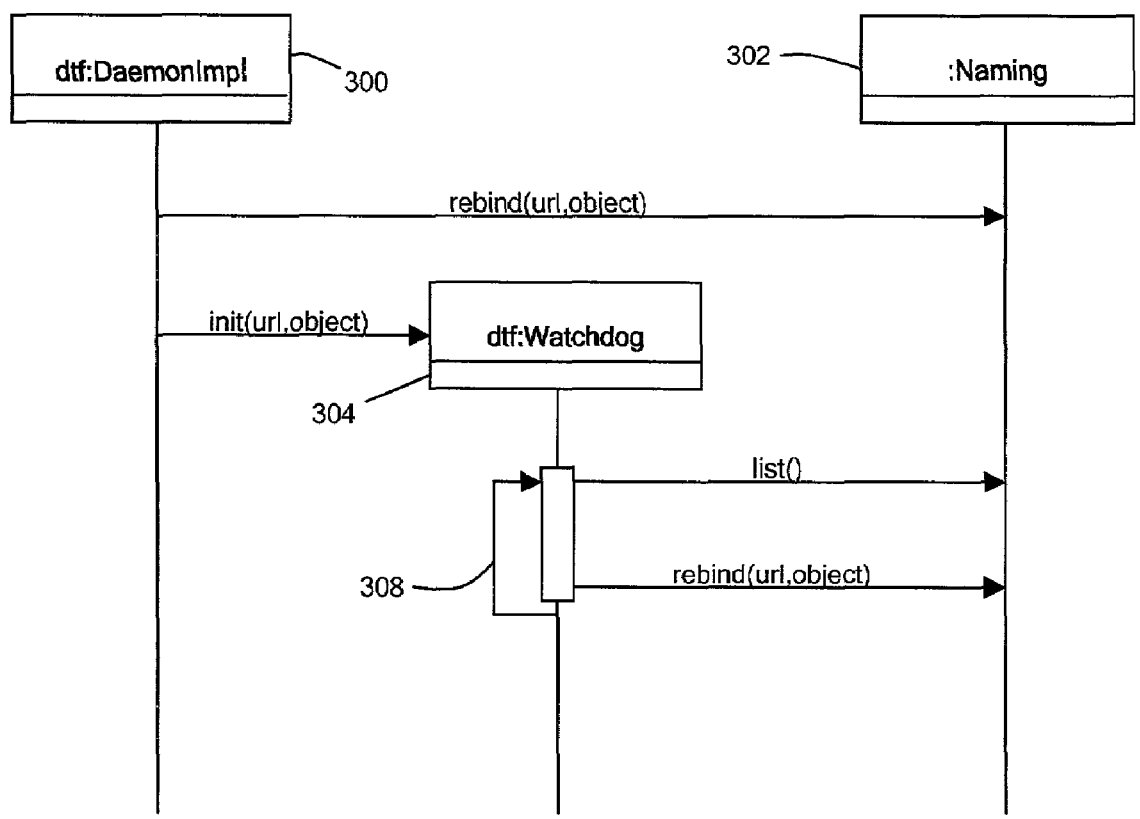
FIG. 5 is a sequence diagram illustrating the operation of a watchdog thread for a parent process.

FIG. 5 is a sequence diagram illustrating the operation of a watchdog thread for a parent process. In the exemplary embodiment illustrated by FIG. 5, the parent process is initiated by an object of class daemonImpl. In addition to an object, the term "daemonImpl" can represent the implementation of a daemon or other process.

The sequence diagram begins at the object named dtf of class daemonImpl, illustrated as dtf:DaemonImpl 300 in FIG. 5. The daemonImpl object dtf 300 initiates a parent process, having an associated object 304, named dtf, of class watchdog. The daemonImpl object dtf 300 first performs a synchronous rebind call to the RMI process initiated by the RMI object 302, which may include, for example, a JAVA® naming object. In the rebind call, the daemonImpl object dtf 300 provides its URL and interface object to the RMI process, thereby binding the daemonImpl object dtf 300 information with an active RMI process.

Once the daemonImpl object dtf 300 is bound with an active RMI process, the daemonImpl object dtf 300 performs an asynchronous initialize (init) call its associated watchdog object, dtf:Watchdog 304. Calling the watchdog object 304 starts a watchdog thread for the daemonImpl object dtf 300. The watchdog thread is illustrated as extending from the bottom of the watchdog object 304.

The watchdog thread includes a loop 308, in which a synchronous list call is performed in order to determine whether the URL of the parent process is in the bound URL list of an active RMI process. If the parent process URL is not listed with an active RMI process, the watchdog thread performs a rebind call to the RMI process in order to rebind the parent process with the active RMI process. The watchdog thread continues to perform list calls as long as the watchdog thread has not been terminated.

According to the above embodiment of the invention, if an RMI process becomes inactive for some reason, each parent process running a watchdog thread can quickly rebind with an active RMI process. Therefore, it is not necessary to restart every process upon inactivation of the RMI process.

The above sequence was described with reference to a parent process initiated by the daemonImpl object dtf 300, however the principles of the present invention apply to any daemon or other process having an associated object for generating a watchdog thread.

The steps of the above embodiments can be implemented with hardware or by execution of programs, modules or scripts. The programs, modules or scripts can be stored or embodied on one or more computer readable mediums in a variety of formats, such as source code, object code or executable code, for example. The code can be implemented in the Java® programming language, as described above, or in other programming languages. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A computerized method of error recovery of a bound remote method invocation (RMI) interface object, the method comprising:
   binding an interface object of a parent process with a first RMI process; and
   starting a monitoring agent associated with the interface object, the monitoring agent comprising a thread to perform the steps of:
      determining if the first RMI process is active and if the interface object is bound with any active RMI processes, wherein if the first RMI process is not active and if the interface object is not bound with any active RMI processes, an error occurs, the determining step including:
         obtaining a bound uniform resource locator (URL) list from active RMI processes; and
         determining whether the interface object's name is in the bound URL list obtained from the active RMI processes;
      informing the interface object of the error when the monitoring agent determines that the interface object is not bound with any active RMI processes; and
      rebinding the interface object with an active RMI process when the monitoring agent determines that the interface object is not bound with any active RMI processes, thereby recovering from the error without restarting the parent process that is bound with the first RMI process.

2. The method of claim 1, comprising:
   binding a second interface object of a second parent process with an RMI process; and
   calling a second monitoring agent associated with the second interface object, the second monitoring agent comprising a second thread to perform the steps of:
      monitoring the status of RMI processes; and
      rebinding the second interface object with an active RMI process when the second monitoring agent determines that the second interface object is not bound with an active RMI process.

3. The method of claim 1, wherein the step of binding the interface object comprises:
   binding one of an RMI daemon, a distributed task facility daemon, a log manager daemon, or a domain manager daemon, with an active RMI daemon.

4. The method of claim 1, comprising:
   terminating the thread of the monitoring agent when the parent process is terminated.

5. A network system, comprising:
   a plurality of remote nodes, at least one of the remote nodes running a remote method invocation (RMI) process; and
   a management server for managing the remote nodes, the management server including at least one processor for running an RMI process and at least one management process that is bound with a first RMI process through an interface object, each at least one management process being associated with a monitoring agent comprising a thread to perform the steps of:
      determining if the first RMI process is active and if the interface object is bound with any active RMI processes, wherein if the first RMI process is not active and if the interface object is not bound with any active RMI processes, an error occurs, the determining step including:
         obtaining a bound uniform resource locator (URL) list from active RMI processes; and
         determining whether the interface object's name is in the bound URL list obtained from the active RMI processes;
      informing the interface object of the error when the monitoring agent determines that the interface object is not bound with any active RMI processes; and
      rebinding the interface object with an active RMI process when the monitoring agent determines that the interface object is not bound with any active RMI processes, thereby recovering from the error without restarting the parent process that is bound with the first RMI process.

6. The network system of claim 5, wherein the at least one management process comprises a plurality of management processes.

7. The network system of claim 5, wherein the at least one management process comprises:
   a distributed task facility process;
   a domain manager process; and
   a log manager process.

8. The network system of claim 5, wherein each of the remote nodes runs a service control manager agent process for performing server management tasks.

9. The network system of claim 5, wherein the management server comprises:
   a secondary storage device, the secondary storage device comprising:
      a data repository;
      a depot; and
      a web server.

10. The network system of claim 5, wherein the plurality of remote nodes are arranged into at least one node group, the network system comprising a service control manager for managing the at least one node group.

11. A computerized method of error recovery of a bound remote method invocation (RMI) interface object, the method comprising:
   a) performing a rebind call to a first RMI process to provide a network address and an interface object of a parent process to the first RMI process; and
   b) performing an initialization call to a monitoring agent associated with the interface object, the monitoring agent comprising a thread, the thread performing the steps of:
      1) performing a list call to active RMI processes to determine whether the interface object is bound with any active RMI processes, the list call obtains a bound uniform resource locator (URL) list from the active RMI processes and determines whether the parent process's name is in the bound URL list obtained from the active RMI processes, wherein if the interface object is not bound with any active RMI processes, an error occurs;
      2) informing the interface object of the error when the monitoring agent determines that the interface object is not bound with any active RMI processes;

3) performing a rebind call to an active RMI process if the monitoring agent determines that the interface object is not bound with any active RMI processes, thereby recovering from the error without restarting the parent process that is bound with the first RMI process; and 4) repeating steps 1 through 3.

12. The method of claim 11, wherein the parent process is one of a remote method invocation daemon, a distributed task facility daemon, a log manager daemon, and a domain manager daemon.

13. The method of claim 11, comprising:

terminating the thread of the monitoring agent when the parent process is terminated.

* * * * *